(12) United States Patent
Rosko (10) Patent No.: US 6,189,970 B1
(45) Date of Patent: Feb. 20, 2001

(54) HARNESS FOR JUVENILE VEHICLE SEAT

(75) Inventor: Michael Scot Rosko, Greenwood, IN (US)

(73) Assignee: Cosco Management, Inc., Wilmington, DE (US)

(*) Notice: Under 35 U.S.C. 154(b), the term of this patent shall be extended for 0 days.

(21) Appl. No.: 09/258,453

(22) Filed: Feb. 26, 1999

(51) Int. Cl.$^7$ .................................................. A47C 1/08
(52) U.S. Cl. .......................................................... 297/250.1
(58) Field of Search ................................ 297/250.1, 464, 297/468, 467, 469, 483, 484

(56) References Cited

U.S. PATENT DOCUMENTS

| | | |
|---|---|---|
| D. 278,483 | 4/1985 | Takada . |
| D. 286,470 | 11/1986 | Takada . |
| D. 294,889 | 3/1988 | Nakao et al. . |
| D. 305,583 | 1/1990 | Turner et al. . |
| D. 315,453 | 3/1991 | Takada . |
| D. 319,543 | 9/1991 | Takahashi et al. . |
| D. 334,847 | 4/1993 | Takahashi et al. . |
| D. 366,965 | 2/1996 | Meeker et al. . |
| D. 383,912 | 9/1997 | Meeker et al. . |
| 2,833,555 | 5/1958 | Zotkewicz . |
| 3,910,634 * | 10/1975 | Morris . |
| 4,033,622 | 7/1977 | Boudreau . |
| 4,205,877 | 6/1980 | Ettridge . |
| 4,231,612 | 11/1980 | Meeker . |
| 4,436,341 | 3/1984 | Converse . |
| 4,457,052 | 7/1984 | Hauber . |
| 4,500,133 | 2/1985 | Nakao et al. . |
| 4,540,218 * | 9/1985 | Thomas . |
| 4,545,617 | 10/1985 | Drexler et al. . |
| 4,613,188 | 9/1986 | Tsuge et al. . |
| 4,632,456 | 12/1986 | Kassai . |
| 4,685,741 | 8/1987 | Tsuge et al. . |
| 4,754,999 | 7/1988 | Kain . |
| 4,770,468 | 9/1988 | Shubin . |
| 4,826,246 | 5/1989 | Meeker . |
| 4,880,277 | 11/1989 | Takahashi et al. . |
| 4,912,818 | 4/1990 | Meeker . |
| 4,913,490 | 4/1990 | Takahashi et al. . |
| 4,915,446 | 4/1990 | Darling et al. . |
| 5,052,750 | 10/1991 | Takahashi et al. . |
| 5,082,325 * | 1/1992 | Sedlack . |
| 5,181,761 | 1/1993 | Meeker . |
| 5,236,221 | 8/1993 | Minami . |
| 5,277,472 | 1/1994 | Freese et al. . |
| 5,286,085 | 2/1994 | Minami . |
| 5,551,751 | 9/1996 | Sedlack et al. . |
| 5,580,126 | 12/1996 | Sedlack . |
| 5,611,596 | 3/1997 | Barley et al. . |
| 5,624,135 * | 4/1997 | Symonds . |
| 5,695,243 | 12/1997 | Anthony et al. . |
| 5,775,772 | 7/1998 | Lefranc . |
| 5,842,740 | 12/1998 | Lefranc . |

FOREIGN PATENT DOCUMENTS

| | | |
|---|---|---|
| 2282321 | 5/1995 | (GB) . |
| WO 98/06596 | 2/1998 | (WO) . |

* cited by examiner

Primary Examiner—Milton Nelson, Jr.
(74) Attorney, Agent, or Firm—Barnes & Thornburg (57) ABSTRACT

A child-restraint apparatus is provided that includes a continuous body strap adapted to pass through apertures formed in the seat, so that some segments of the continuous body strap extend across a forward-facing portion of the seat back, while other segments of the continuous body strap extend across a rearward-facing portion of the seat back, thereby anchoring the body strap to the seat and restraining the child situated in the seat.

39 Claims, 7 Drawing Sheets

HARNESS FOR JUVENILE VEHICLE SEAT

BACKGROUND AND SUMMARY OF THE INVENTION

The present invention relates to seats for use by children in vehicles, and particularly, to seats having child-restraining harness belts. More particularly, the present invention relates to a child vehicle seat with a child-restraint harness-adjustment mechanism.

Many child car seats are formed to include several pairs of shoulder belt-receiving apertures in a back wall of the car seat so that the car seat may be adapted by the user to restrain children of different sizes. To accommodate a smaller child, the two shoulder belts are removed from an upper pair of belt-receiving apertures and are threaded through one of the lower pairs of belt-receiving apertures.

As the child grows, it becomes necessary to enlarge the car seat harness to accommodate the growing child. To enlarge the car seat harness, the caregiver must "rethread" the shoulder belt by first removing the shoulder belt from the "lowest" set of shoulder belt-receiving apertures formed in the back wall of the car seat. Then the belt must be threaded through one of the other "higher" sets of belt-receiving apertures formed in a higher portion of the back wall of the car seat. During rethreading, the free end of each shoulder belt must be pulled through and out of its "original" belt-receiving aperture formed in the back wall and then inserted into and threaded through a newly selected belt-receiving aperture that is either higher or lower on the back wall relative to the original belt-receiving aperture.

It is inconvenient and bothersome to uncouple the two shoulder belts from the back wall each time it is necessary to adjust the size of the child-restraint harness to enable the shoulder belts to be threaded through higher or lower shoulder belt-receiving apertures formed in the back wall of the car. Many caregivers would welcome a car seat that is adaptable to hold infants, toddlers, and juveniles and, in particular, is adaptable to adjust the size of the child-restraint harness quickly and easily to accommodate children of various sizes in the child car seat without uncoupling the shoulder belts from the back wall.

In accordance with the present invention, a child-restraint apparatus includes a seat adapted to seat a child and a multi-segment, continuous body strap adapted to pass through apertures formed in the seat so that some segments of the continuous body strap extend across a forward-facing portion of a seat back included in the seat to restrain the child situated in the seat and other segments of the continuous body strap extend across a rearward-facing portion of the seat back to anchor the body strap to the seat. A buckle unit is provided to couple the segments of the body strap that extend across the forward-facing portion of the seat back to a seat bottom also included in the seat.

In preferred embodiments, the body strap is made of an elongated single strip of material having first and second ends and a strap buckle is coupled to the first end. The multi-segment body strap includes, in series, a first segment having the first end, second, third, fourth, and fifth segments, and a sixth segment having the second end.

To couple the body strap to the seat, the body strap is passed through spaced-apart apertures formed in the seat bottom and through a selected pair of apertures formed in the seat back. There are several pairs of apertures formed in the seat back, each pair located at a different height above the seat bottom. The body strap passes through the uppermost pair of belt-receiving apertures formed in the seat back so that the child-restraint device is always "set up" to accommodate a large child in the seat. The second end of the body strap is passed through the strap buckle that is coupled to the first end of the body strap and then moved to place the strap buckle along the body strap at a position between the fifth and sixth segments.

Once the body strap is coupled to the seat, the second segment is arranged to embrace the left shoulder of a child seated on the seat, the fourth segment is arranged to embrace the right shoulder of a child seated on the seat, and the first, fifth, and third segments cooperate to define an X-shaped anchor embracing both of the rearward-facing portion of the seat back and the downwardly facing portion of the seat bottom. The first and fifth segments cooperate to define a first leg of the X-shaped anchor and the third segment defines a second leg of the X-shaped anchor that is arranged to lie between the first leg and the seat back.

The buckle unit includes a crotch strap coupled to the seat bottom and a latch member coupled to the free end of the crotch strap. The buckle unit also includes a first latch plate coupled to the body strap to slide along the second segment and releasably engage the latch member and a second latch plate coupled to the body strap to slide along the fourth segment and releasably engage the latch member. The second and fourth segments of the body strap and the crotch strap cooperate to define a 5-point harness once the first latch plate on the second segment and the second latch plate on the fourth segment are "snapped" into engagement with the latch member on the crotch strap.

The seat also includes a body strap mount coupled to the seat back to grasp "middle" portions (i.e., loops) of the second and fourth segments that are pushed "back" through other lower pairs of shoulder belt-receiving apertures formed in the seat back below the uppermost pair of apertures without ever removing "upper" portions of the second and fourth segments from the uppermost pair of shoulder belt-receiving apertures formed in the seat back in order to change the effective "size" of the child-restraint harness established by the body strap. Thus, the child-restraint apparatus of the present invention is adapted to adjust the size of the child-restraint harness to accommodate children of various sizes without having to uncouple the body strap from the seat.

Additional features of the invention will become apparent to those skilled in the art upon consideration of the following detailed description of preferred embodiments exemplifying the best mode of carrying out the invention as presently perceived.

BRIEF DESCRIPTION OF THE DRAWINGS

The detailed description particularly refers to the accompanying figures in which.

DETAILED DESCRIPTION OF THE DRAWINGS

Figures 1, 2, 3:
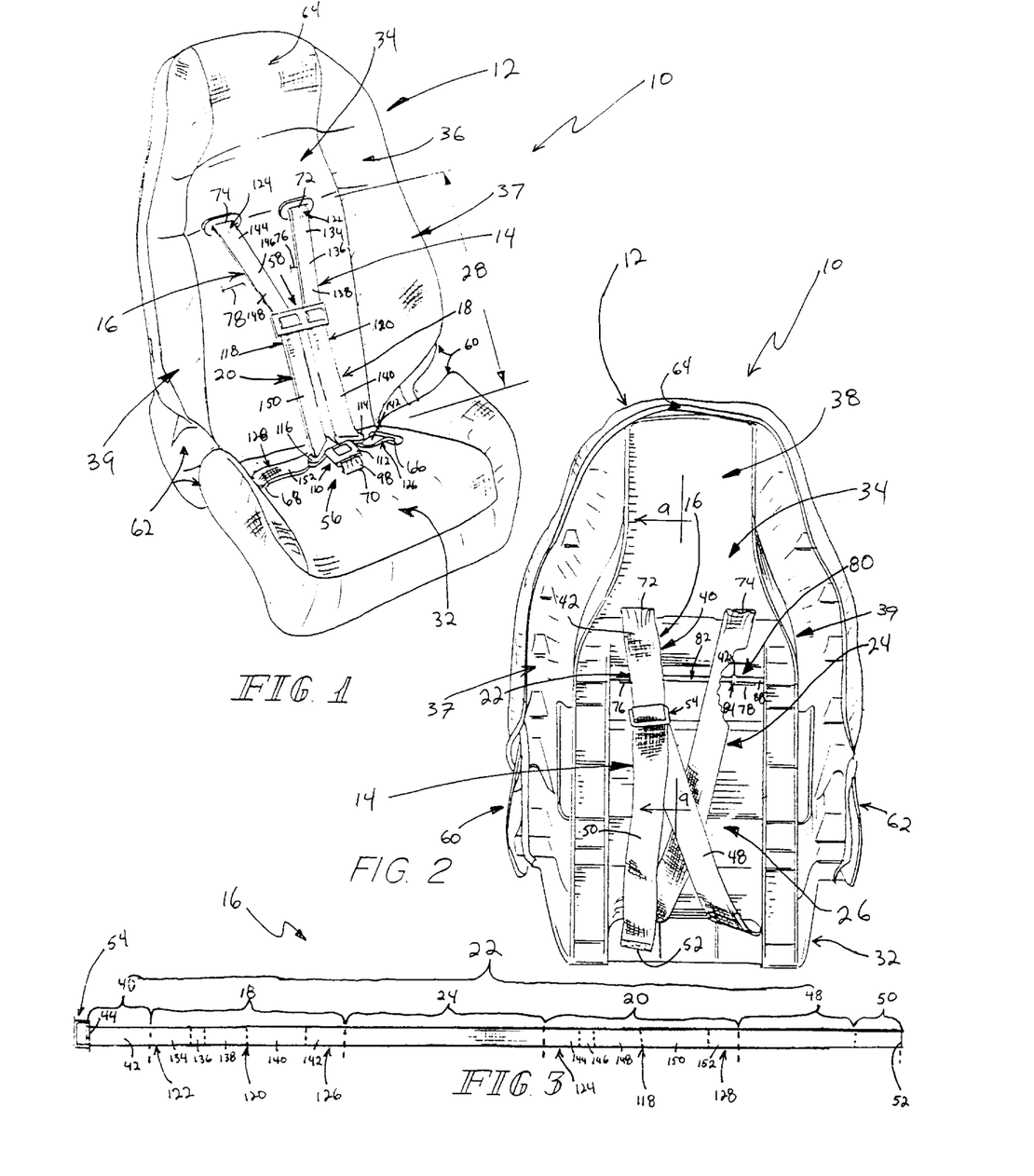
FIG. 1 is a front perspective view of a child-restraint apparatus showing a seat and two segments of a multi-segment, continuous body strap coupled to a buckle unit to form a 5-point harness on a forward-facing portion of the seat, a second segment of the body strap being arranged to embrace the left shoulder of a child (not shown) seated on the seat, and a fourth segment of the body strap being arranged to embrace the light shoulder of such a child.
FIG. 2 is a rear elevation of the child-restraint apparatus of FIG. 1 showing an X-shaped anchor formed by certain segments of the multi-segment body strap and arranged to embrace a rearward-facing portion of a seat back included in the seat, first and fifth segments of the body strap cooperating to define a negatively sloping first leg of the X-shaped anchor, a third segment of the body strap defining a positively sloping second leg of the X-shaped anchor, and a sixth segment of the body strap hanging downwardly from a strap buckle coupled to the first leg of the X-shaped anchor.
FIG. 3 is a top plan view of the multi-segment continuous body strap of FIGS. 1 and 2 after it has been removed from the seat and stretched out to its full length showing the six segments of the multi-segment body strap (in order from left to right) wherein the strap buckle is coupled to a left end of the body strap.
Figures 6, 7:
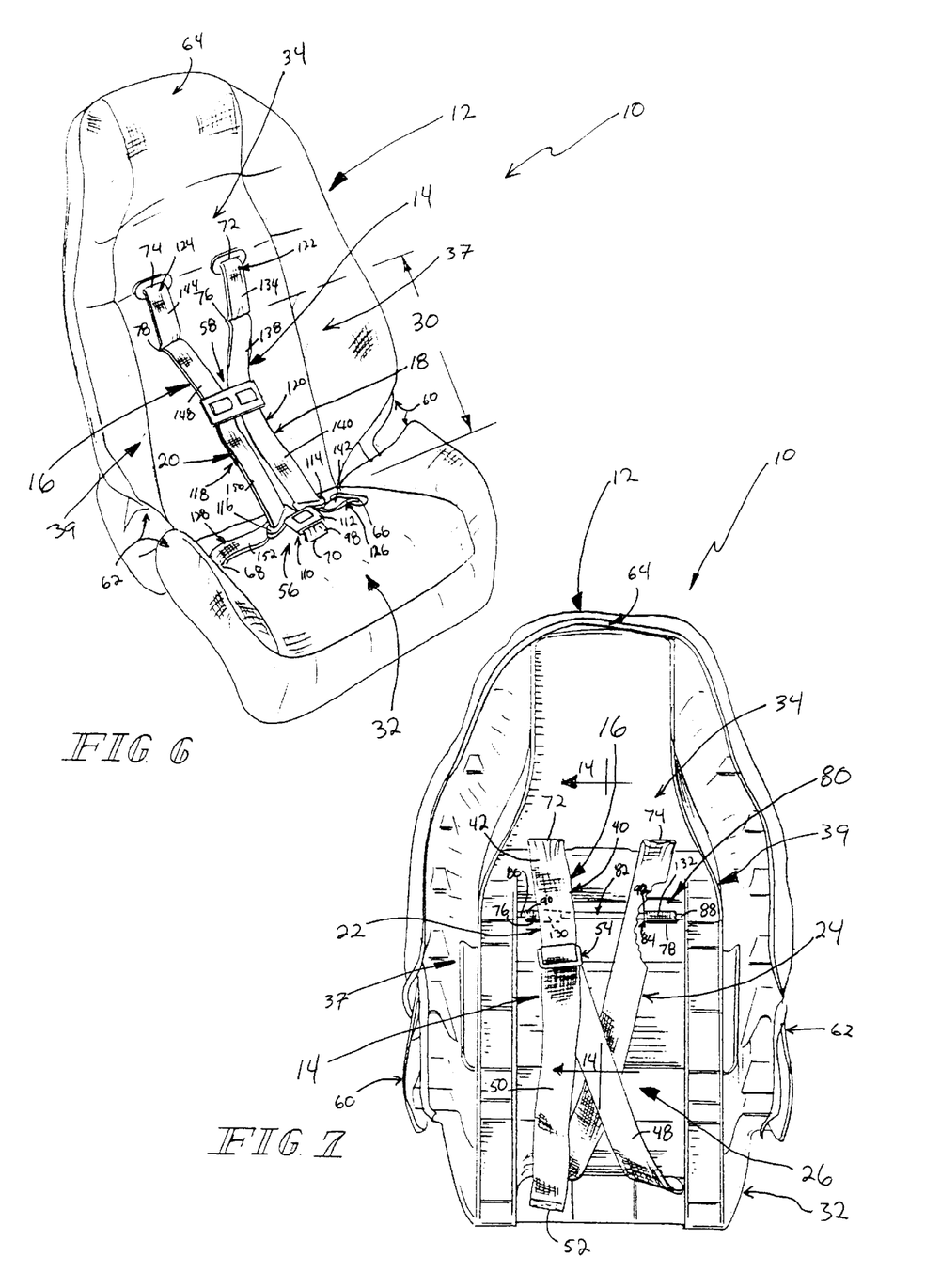
FIG. 6 is a front perspective view similar to FIG. 1 showing "middle" parts of the second (i.e., left shoulder) and fourth (i.e., right shoulder) segments of the body strap "pushed back" through another lower pair of apertures formed in the seat back beneath the "uppermost" pair of apertures already receiving the body strap to lower the "effective shoulder height" of the 5-point harness to accommodate a smaller child in the seat without removing the body strap from the uppermost pair of apertures.
FIG. 7 is a rear elevation view similar to FIG. 2 showing the middle parts of the second and fourth segments looped around the rod of the strap mount held in place on the rearward-facing portion of the seat back.

A child-restraint apparatus 10 includes a seat 12 sized to seat a child (not shown) and a harness 14 configured to secure the child in seat 12. Harness 14 includes a strap 16 that is shown in FIG. 3 and coupled to seat 12 as shown in FIGS. 1 and 2 to aid in securing the child positioned in seat 12. Strap 16 is adjustable between a "large child" configuration as shown in FIG. 1 and a "small child" configuration as shown in FIG. 6 without uncoupling strap 16 from seat 12.

Body strap 16 is passed through apertures formed in a seat bottom 32 and a seat back 34 of seat 12 as shown, for example, in FIGS. 1 and 2 to couple body strap 16 to seat 12 so that harness 14 is adapted to receive and restrain a larger child seated in seat 12. Body strap 16 includes first and second restraint portions 18, 20 extending across a forwardly facing side 36 of seat 12 as shown in FIG. 1. Body strap 16 also includes a negatively sloping first leg 22 and a positively sloping second leg 24 that intersects negatively sloping second lea 24 to define an X-shaped anchor 26 as shown in FIG. 2.

As shown, for example, in FIG. 3, body strap 16 is an elongated, continuous, single strap of material having first and second ends 44, 52 and a strap buckle 54 coupled to first end 44. To help visualize how a single strap can be coupled to seat 12 to provide harness 14 it is convenient to "divide" body strap 16 into six segments arranged in series and extending "end-to-end" from first end 44 of body strap 16 to second end 52 of body strap 16. The multi-segment body strap 16 includes, in series, a first segment 40 having first end 44, second segment 18, third segment 24, fourth segment 20, fifth segment 48, and sixth segment 50 having second end 52. Dotted lines are drawn on body strap 16 in FIG. 3 to represent division lines between adjacent segments and parts of segments for illustrative purposes only.

As shown in FIGS. 1 and 3, second segment 18 of body strap 16 is arranged to provide first restraint portion 18 extending across forwardly facing side 36 of seat 12 to embrace the left shoulder and thigh of a child seated on seat 12 once body strap 16 is coupled to seat 12. Fourth segment 20 of body strap 16 is arranged to provide second restraint portion 20 extending across forwardly facing side 36 of seat 12 to embrace the right shoulder and thigh of a child seated on seat 12 once body strap 16 is coupled to seat 12. As shown in FIG. 1 and described below, a buckle unit having two latch members is used to selectively couple portions of second segment 18 (i.e., left shoulder restraint) and fourth segment 20 (i.e., right shoulder restraint) to seat bottom 32 to establish 5-point harness 14 on seat 12.

As shown in FIGS. 2 and 3, first and fifth segments 40, 48 of body strap 16 cooperate to define negatively sloping first leg 22 of X-shaped anchor 26 once body strap 16 is coupled to seat 12. Third segment 24 defines positively sloping second leg 24 of X-shaped anchor 26 once body strap 16 is coupled to seat 12. Sixth segment 50 of body strap 16 hangs freely down from strap buckle 54 that is positioned to lie on and define the "division line" between fifth and sixth segments 48, 50 of body strap 16 as shown in FIG. 2.

When body strap 16 is arranged to assume the large-child position as shown in FIGS. 1 and 2, second and fourth segments 18, 20 have a tall shoulder height 28, and when body strap 16 is arranged to assume the small-child position, as shown in FIGS. 6 and 7, second and fourth segments 18, 20 are adapted to have a short shoulder height 30 that is less than tall shoulder height 28. Short shoulder height 3) permits a small child to be secured in seat 12. Child-restraint apparatus 10 is versatile in that a caregiver can move body strap 16 between the large-child and small-child positions easily (as shown, for example, in FIGS. 9–14) without ever uncoupling body strap 16 from seat 12.

Harness 14 further includes a buckle unit 56 and a strap retainer 58 as shown in FIG. 1. Buckle unit 56 couples body strap 16 to seat 12 and lies in a position between the legs of a child situated in seat 12. Strap retainer 58 couples second and fourth segments 18, 20 of body strap 16 together and lies in a position near the chest of a child seated in seat 12 as shown in FIG. 1.

Seat 12 is molded out of plastics material to form a child-supporting seat. Although seat 12 is a one-piece molded body in the illustrated embodiment, it is within the scope of the present disclosure to use a multiple-piece body. Seat 12 includes seat bottom 32 adapted to support a child's bottom and upper legs and seat back 34 positioned to lie at an angle to seat bottom 32. Seat bottom 32 and seat back 34 cooperate to define first and second side walls 60, 62 limiting lateral movement of the child in seat 12. A seat 64 is provided to cover seat bottom 32 and seat back 34.

Figure 4:
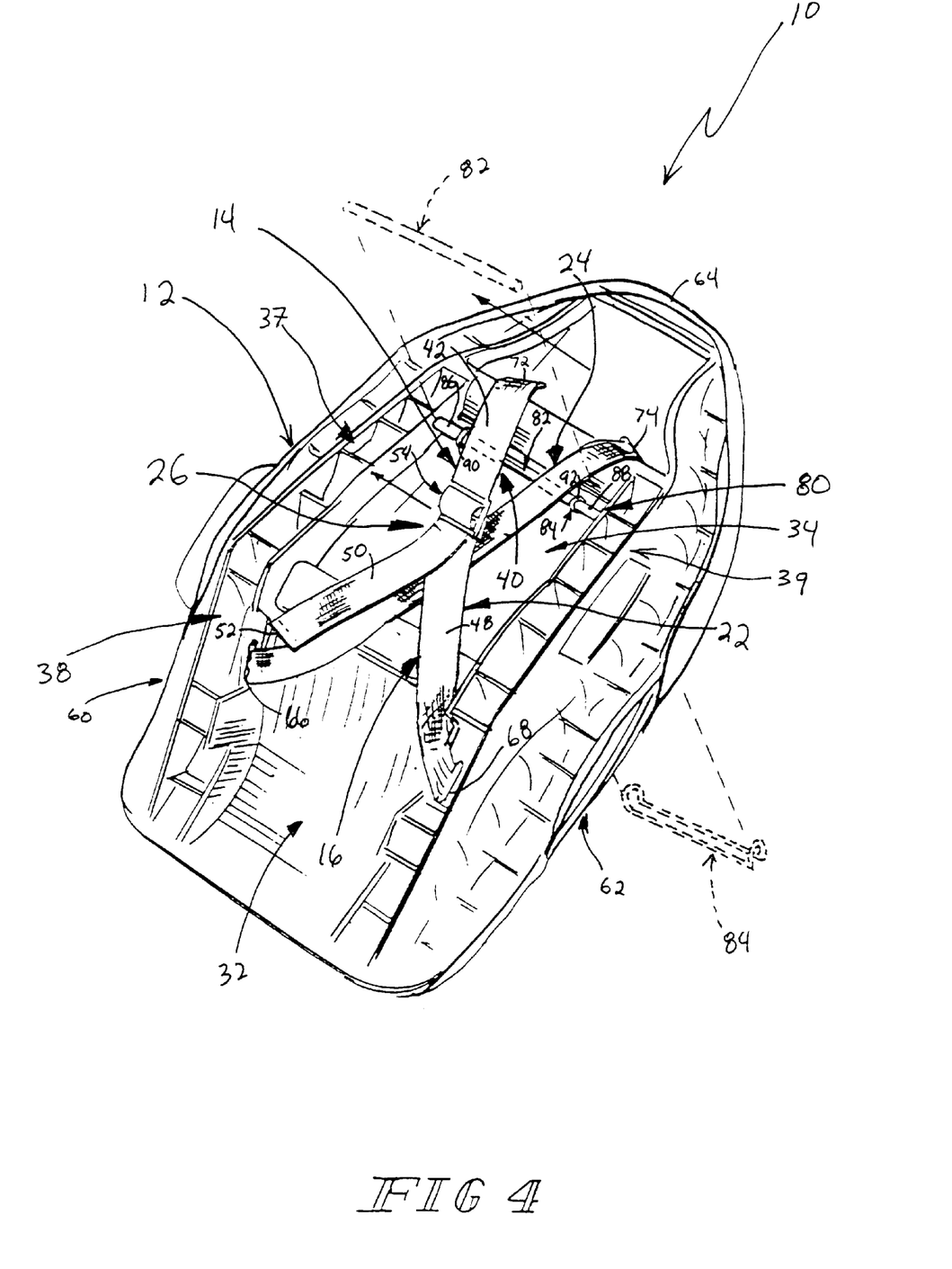
FIG. 4 is a perspective view similar to FIG. 2 also showing the back side of the seat and a body strap mount (in phantom) including a rod and elastic band for coupling the rod to the seat back to permit movement of the rod relative to the seat back during height adjustment of the body strap as shown, for example, in FIGS. 9–14.
Figure 5:
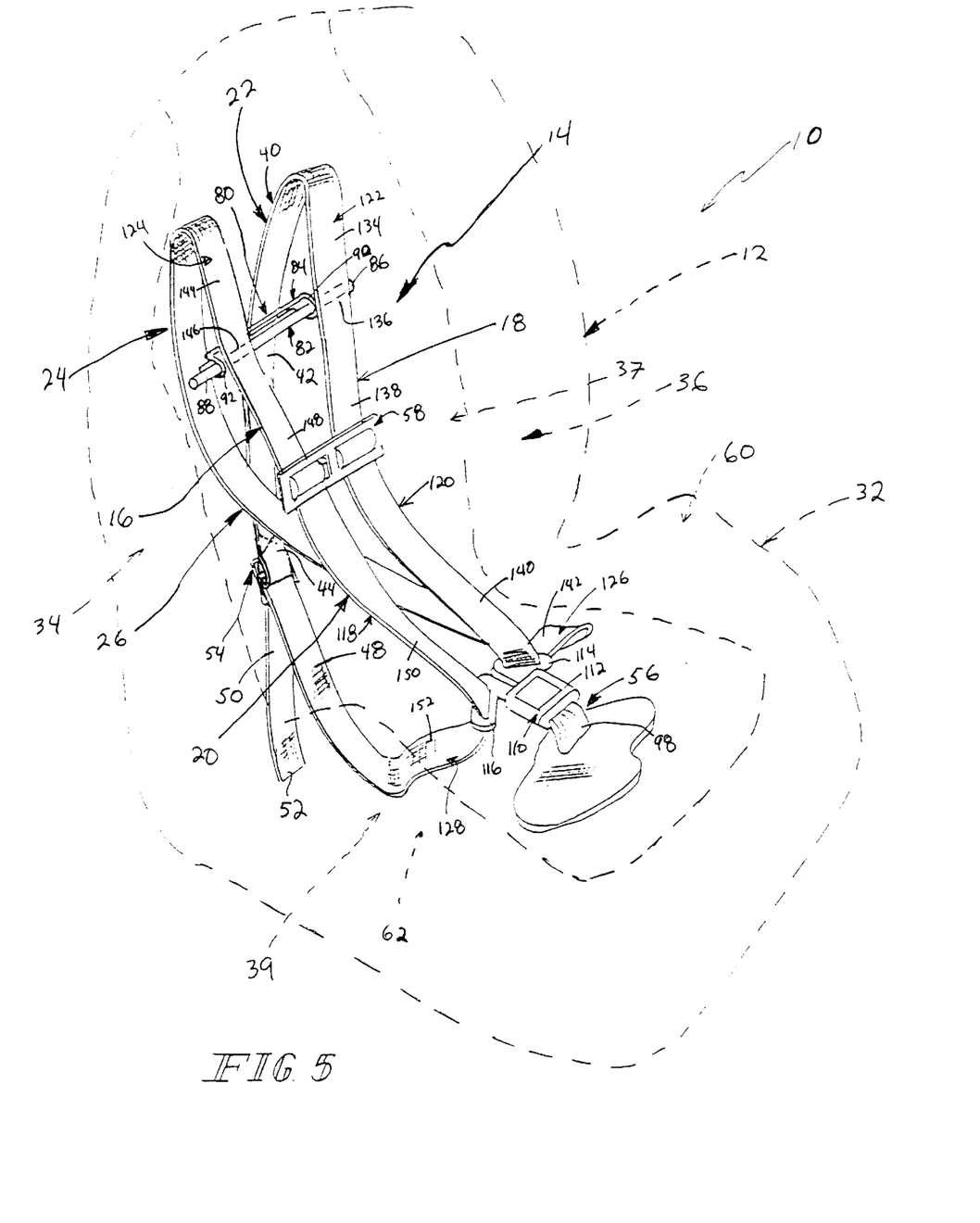
FIG. 5 is a perspective view of the multi-segment body strap of FIG. 3 coupled to the seat (shown in phantom) of FIGS. 1, 2, and 4 showing how a continuous strap can be threaded through two apertures (see FIGS. 1 and 2) formed in the seat bottom and two apertures (see FIGS. 1 and 4) formed in the seat back and coupled to a buckle unit on the seat bottom to form a 5-point harness.

As shown in FIGS. 1 and 4, seat bottom 32 is formed to include a first seat bottom aperture 66, a second seat bottom aperture 68 spaced apart from first seat bottom aperture 66, and a third seat bottom aperture 70 arranged to lie between first and second seat bottom apertures 66, 68 so as to receive buckle unit 56 therein. Body strap 16 passes through first and second seat bottom apertures 66, 68 as shown in FIGS. 1 and 4 and as shown in FIG. 6, whether body strap 16 is arranged to assume its large-child or small-child position.

Figure 8:
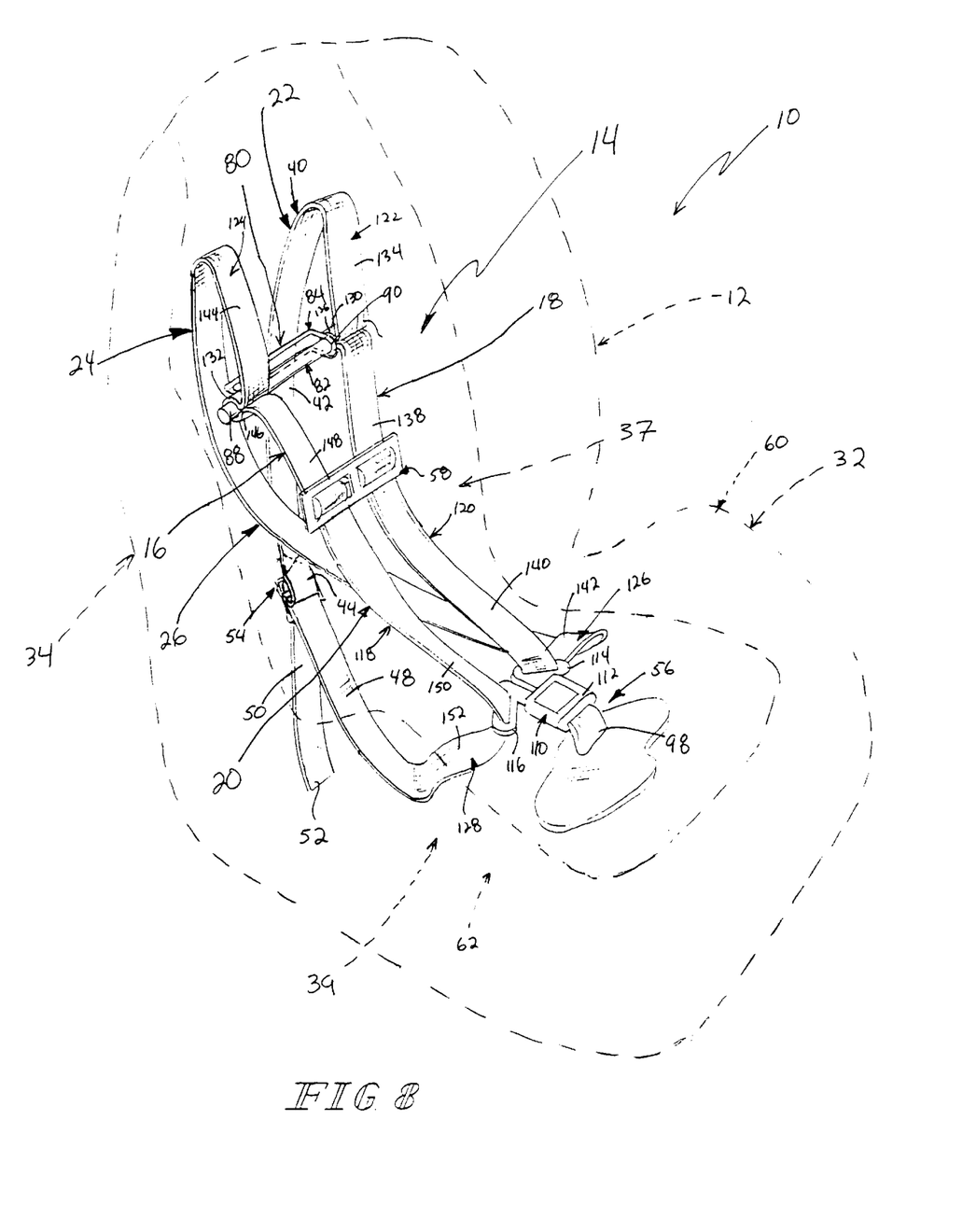
FIG. 8 is a perspective view similar to FIG. 5 showing the middle part of the second segment (i.e., left shoulder) looped around a right end of the rod and the middle part of the fourth segment (i.e., right shoulder) looped around a left end of the strap rod to lower the effective shoulder height of the harness.
Figure 9:
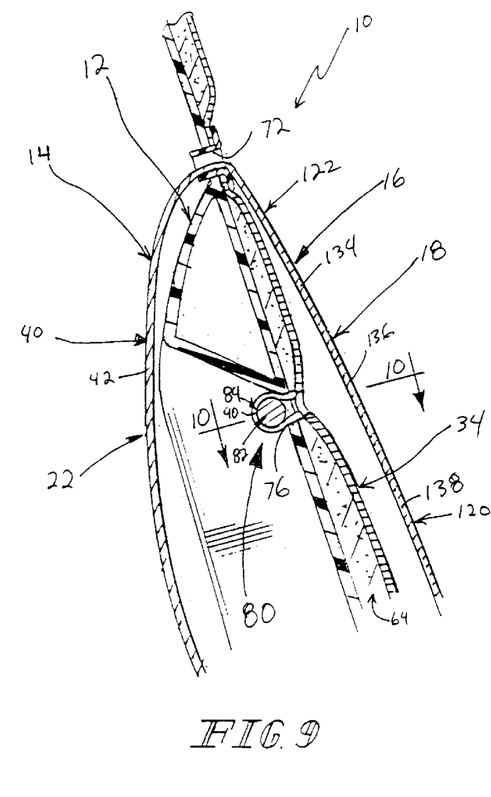
FIG. 9 is a cross-sectional view of the child-restraint apparatus of FIGS. 1 and 2 that is adapted to restrain a larger child taken along line 9—9 of FIG. 2 showing the body strap passing through one of the uppermost pair of apertures formed in the seat back to establish the "tall shoulder height" of the harness shown in FIG. 1 and showing the elastic band holding the rod in place against the seat back adjacent to one of a lower pair of apertures formed in the seat back.

Seat back 34 is formed to include two pairs of strap-receiving apertures and these apertures are arranged so that body strap 16 always passes through an uppermost pair of apertures 72, 74 to establish the large-child position of body strap 16 as shown, for example, in FIGS. 1, 2, 4, and 5 and so that "middle" parts of body strap 16 can be "pushed back" through a lower pair of apertures 76, 78 by a caregiver to establish the small-child position of body strap 16 as shown, for example, in FIGS. 6–8. Seat back 34 is formed to include first upper seat back aperture 72, second upper seat back aperture 74 spaced apart from first upper seat back aperture 72, first lower seat back aperture 76, and second lower seat back aperture 78 spaced apart from first lower seat back aperture 76. Thus, seat 12 is formed to include seven apertures 66, 68, 70, 72, 74, 76, 78, six of which are arranged to receive body strap 16 and one of which receives buckle unit 56.

Figure 10:
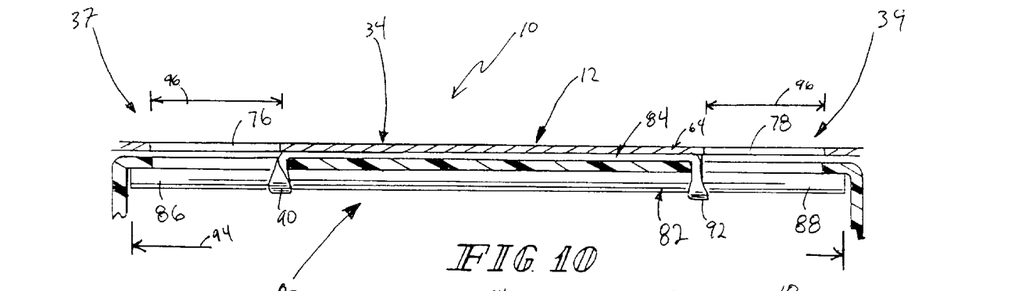
FIG. 10 is a cross-sectional view taken along line 10—10 of FIG. 9 showing the rod and the elastic band fed through the lower pair of apertures and "looped" around the rod to hold the rod against the seat back.

Child-restraint apparatus 10 further includes a strap mount 80 including a metal rod 82 and a band 84 made of elastic material as shown in FIGS. 4 and 10–13. Rod 82 may also be made of other materials such as plastic or wood. Strap mount 80 couples second and fourth segments 18, 20 to seat back 34 to permit adjustment of body strap 16 between the small-child position and the large-child upper position. Rod 82 includes first and second ends 86, 88 and is positioned to lie on a back side 38 of seat 12. Rod 82 has a length 94 measured between first end 86 and second end 88. First and second lower seat back apertures 76, 78 have lengths 96 that are shorter than length 94 as shown in FIG. 10.

Band 84 is positioned partly on front side 36 of seat 12 and fed through first and second lower seat back apertures 76, 78 to form a first loop 90 and a second loop 92 on back side 38 of seat 12 into which rod 82 is positioned to lie as shown in FIG. 4. Because band 84 is elastic, it provides a resilient member that resiliently couples rod 82 to seat 12 so that rod 82 can be moved relative to seat 12 during adjustment of body strap 16 between the large-child and small-child positions without uncoupling rod 82 from seat 12 as shown, for example, in FIGS. 11 and 12.

Buckle unit 56 includes a crotch strap 98 coupled to seat 12 and an A-buckle 110 coupled to crotch strap 98. Crotch strap 98 extends into third seat bottom aperture 70 to secure A-buckle 110 to seat bottom 32. A-buckle 110 includes a latch member 112 and a pair of latch plates 114, 116 coupling body strap 16 to latch member 112 as shown in FIG. 1.

To couple body strap 16 to seat 12 initially, second end 52 of body strap 16 is fed in sequence through first upper seat back aperture 72, strap retainer 58, latch plate 114, first seat bottom aperture 66, second upper seat back aperture 74, latch plate 116, second seat bottom aperture 68, and buckle 54, as shown in FIGS. 1, 2, and 4 so that the first, fifth, and third segments 40, 48, 24 (defining X-shaped anchor 26), sixth segment 50, and strap buckle 54 remain on back side 38 of seat 12 and the remainder of strap 16 (e.g., second and fourth segments 18, 20) is positioned to lie on a front side 36 of seat 12. To accomplish this configuration, second end 52 of body strap 16 is fed through first upper seat back aperture 72. Next, second end 52 is fed through strap retainer 58 and latch plate 114. Then second end 52 is fed through first seat bottom aperture 66 so that second segment 18 remains positioned on front side 36 of seat 12 and the remainder of body strap 16 is positioned to lie on back side 38 of seat 12.

Body strap 16 is then crossed over from a right side 37 of seat 12 to a left side 39 of seat 12 as shown in FIGS. 2 and 4 and fed through second upper seat back aperture 74 so that third segment 24 of body strap 16 is positioned to lie on back side 38 of seat 12. Second end 52 is then fed through latch plate 116 and into second seat bottom aperture 68 so that fourth segment 20 is positioned to lie on front side 36 of seat 12. Second end 52 is extended from left side 39 of seat 12 to right side 37 of seat 12 and fed through buckle 54 to secure first end 44 to fifth and sixth segments 48, 50. Body strap 16 can also be initially coupled to seat 12 by feeding second end 52 of body strap 16 in sequence through second upper seat back aperture 74, strap retainer 58, latch plate 116, second seat bottom aperture 68, first upper seat back aperture 72, latch plate 114, first seat bottom aperture 66, and buckle 54.

To situate and restrain a child (not shown) in child-restraint apparatus 10, the child is placed in seat 12 so that second segment 18 is positioned to extend over the child's left shoulder and thigh, fourth segment 20 is positioned to extend over the child's right shoulder and thigh, and buckle unit 56 is positioned between the child's legs. A middle part 118 of fourth segment 20 is hooked onto strap retainer 58 to couple a middle part 120 of second segment 18 to fourth segment 20. Latch plates 114, 116 are latched into latch member 112 to couple middle parts 118, 120 to latch member 112 and secure the child's legs in child-restraint apparatus 10. To remove the child, the above steps are reversed.

Thus, harness 30 is coupled to seat 12 at five different locations as shown in FIG. 1 so that a child's shoulders and legs are secured to child-restraint apparatus 10. For example, second and fourth segments 18, 20 include top parts 122, 124 that extend into first and second upper seat back apertures 72, 74 to restrain a child's shoulders against seat back 34 when body strap 16 is in the large-child position while the remaining portion of body strap 16 couples second and fourth segments 18, 20 together. Second and fourth segments 18, 20 also include bottom parts 126, 128 that extend into first and second seat bottom apertures 66, 68 and cooperate with A-buckle 110 to restrain a child's thighs and legs against seat bottom 32. Middle parts 120, 118 of second and fourth segments 18, 20 couple to strap retainer 58 to retain second and fourth segments 18, 20 on the chest of a child situated in child-restraint apparatus 10.

Figure 11:
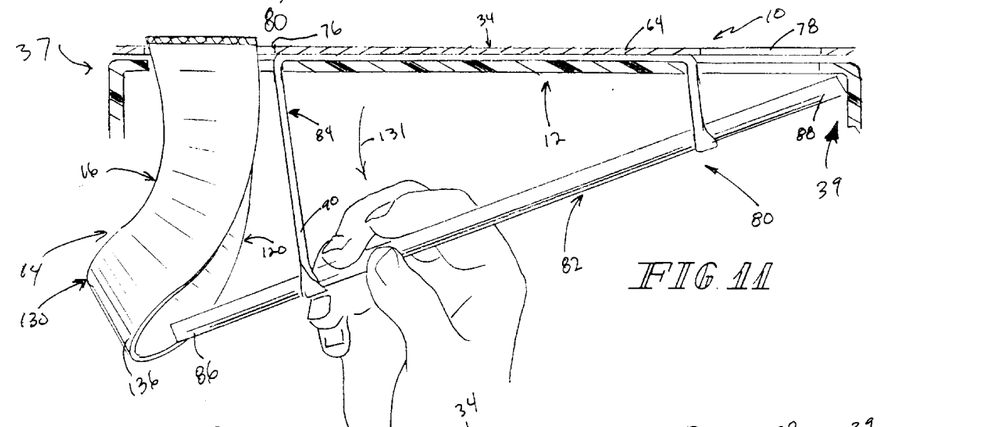
FIG. 11 is a view similar to FIG. 10 showing a middle part of the second segment (i.e., left shoulder) of the body strap being pushed back through one of the lower pair of apertures shown in FIGS. 1 and 9 to form a loop and movement of the rod relative to the seat back to stretch the elastic band to enable a caregiver to position one end of the rod in that loop.
Figures 12, 13:
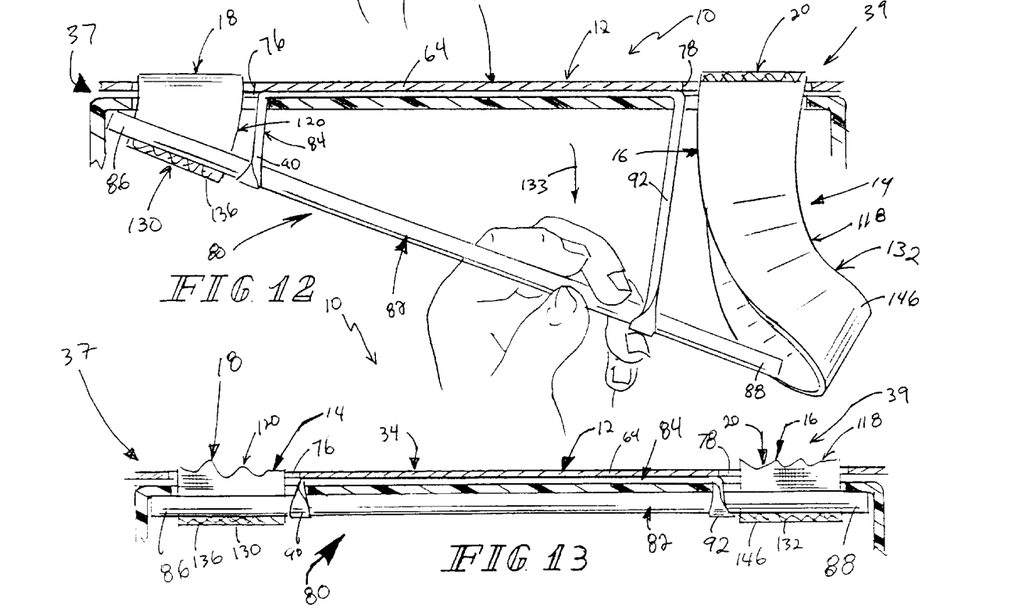
FIG. 12 is a view similar to FIGS. 10 and 11 showing a middle part of the fourth segment (i.e., right shoulder) of the body strap being pushed back through the other of the lower pair of apertures shown in FIG. 1 to form a loop and further movement of the rod relative to the seat back to stretch the elastic band to enable a caregiver to position the other end of the rod in that loop.
FIG. 13 is a view similar to FIGS. 10–12 taken along line 13—13 of FIG. 14 showing use of the rod and elastic band to "fix" the looped middle parts in the lower pair of apertures formed in the seat back to establish a "short shoulder height" of the harness as shown in FIGS. 6–8.
Figure 14:
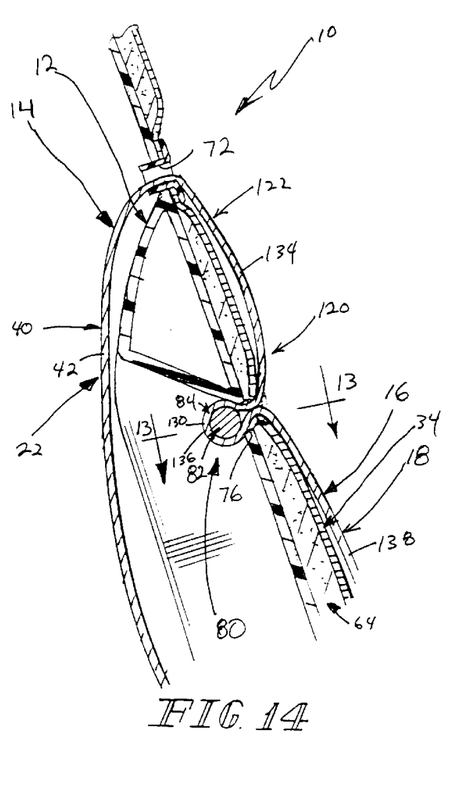
FIG. 14 is a cross-sectional view taken along line 14—14 of FIG. 7 showing the rod in the loop formed in the second segment of the body strap.

To adjust strap 14 from the large-child position shown in FIGS. 1 and 2 to the small-child position shown in FIGS. 6 and 7, middle parts 120, 118 of second and fourth segments 18, 20 are "pushed" through first and second lower seat back apertures 76, 78 to form first and second loops 130, 132, as shown in FIGS. 12–14. As shown in FIG. 11, first end 86 of rod 82 is pulled away from seat back 34 in direction 131 so that first end 86 can be positioned to lie within first loop 130. As shown in FIG. 13, second end 88 of rod 82 is pulled away from seat back 34 in direction 133 so that second end 88 can be positioned to lie within second loop 132. Rod 82 is then released and elastic band 84 pulls rod 82 back against seat back 34.

Any "slack" remaining in first and second loops 130, 132 is then pulled through first and second lower seat back apertures 76, 78 to "lengthen" second and fourth segments 18, 20. By positioning first and second ends 86, 88 of rod 82 in respective loops 130, 132, middle parts 120, 118 of second and fourth segments 18, 20 are secured on seat back 34 so that body strap 16 is coupled further down on seat back 34 and arranged to secure a smaller child without removing body strap 16 from seat 12.

While in the small-child position, body strap 16 is coupled to seat 12 at seven locations (first seat bottom aperture 66, first upper seat back aperture 72, first lower seat back aperture 76, second seat bottom aperture 68, second upper seat back aperture 74, second lower seat back aperture 78, and buckle unit 56) and has short shoulder height 30 for a small child that is less than tall shoulder height 28 for a large child. To move body strap 16 from the small-child position to the large-child position, rod 82 is removed from first and second loops 90, 92 and loops 130, 132 are pulled through seat back 34 to front side 36 to "lengthen" second and fourth segments 18,20.

While in the small-child position, second segment 18 is partitioned into a first section 134 between first upper seat back aperture 72 and first lower seat back aperture 76, a second section 136 forming loop 130, a third section 138 between first lower seat back aperture 76 and strap retainer 58, a fourth section 140 between strap retainer 58 and latch plate 114, and a fifth section 142 between latch plate 114 and first seat bottom aperture 66. While in the small-child position, fourth segment 20 is partitioned into a first section 144 between second upper seat back aperture 74 and second lower seat back aperture 78, a second section 146 forming loop 132, a third section 148 between second lower seat back aperture 78 and strap retainer 58, a fourth section 150 between strap retainer 58 and latch plate 116, and a fifth section 152 between latch plate 116 and second seat bottom aperture 68.

Thus, rod 82 provides an extended member that hooks and couples middle parts 120, 118 of second and fourth segments 18, 20 of body strap 16 to seat 12 to secure second and fourth segments 18, 20 in the small-child position without removing body strap 16 from seat 12. Rod 82 is movable from a locked position securing middle parts 120, 118 of second and fourth segments 18, 20 of body strap 16 to seat back 34 and an unlocked position uncoupling middle parts 120, 118 from seat back 34 which also moves body strap 16 from the small-child position to the large-child position.

Devices other than elastic band 90 may also be used to couple rod 88 to seat back 34. For example, a clip (not shown) coupled to seat back 34 at a location adjacent to lower seat back apertures 76, 78 "clips" rod 88 to seat back 34. The preferred clip is a rib sized to receive and secure rod 88 on seat back 34. After positioning rod 88 in loops 130, 132 formed by pushing middle parts 118, 120 through lower seat back apertures 76, 78, rod 88 is secured in the clip to secure middle parts 118, 120 of strap 16 to seat back 34. More than one clip may be provided to secure rod 88 to seat back 34.

Devices other than single rod 88 may also be used to couple middle parts 118, 120 of strap 16 to seat back 34. For example, a set of clips (not shown) coupled to seat back 34 and a set of shorter rods (not shown) secure middle parts 118, 120 of strap 16 to seat back 34. The set of clips are coupled to seat back 34 adjacent lower seat back apertures 76, 78. After each rod is positioned to lie in a respective loop 130, 132 formed by pushing middle parts 118, 120 of strap 16 through lower seat back apertures 76, 78, each respective rod is secured to seat back 34 by the clips to secure middle parts 118, 120 of strap 16 to seat back 34.

Strap mount 80 including rod 88 and elastic band 90 is not the only strap mount capable of coupling middle parts 118, 120 of strap 16 to seat back 34. For example, a strap mount (not shown) including clips (not shown) coupled to seat back 34 can couple middle parts 118, 120 to seat back 34. Each clip is sized and positioned to provide a catch for securing loops 130, 132 on back side 38 of seat 12. After portions of middle parts 118, 120 are pushed through lower seat back apertures 76, 78 to form loops 130, 132, each loop 130, 132 is positioned within a respective clip to secure middle parts 118, 120 of strap 16 to seat back 34 and establish the lower effective should height position of strap 16.

A set of hooks (not shown) is also used as a strap mount to couple middle parts 118, 120 of strap 16 to seat back 34. For example, a set of hooks are coupled to seat back 34 at a position between cover 64 and a front side of seat back 34 at an elevation corresponding to a lower effective shoulder height. Each hook includes an extended member (not shown) that "hooks" and secures respective middle parts 118, 120 of strap 16 to seat back 34 to establish the lower effective shoulder height. A set of hooks may be coupled to a back side of seat back 34 to hook loops 130, 132 formed by pushing portions of middle parts 118, 120 through lower seat back apertures 76, 78. When hooks are provided on the front side of seat back 34, portions of middle parts 118, 120 are not pushed through a lower set of seat back apertures.

As shown in FIGS. 1 and 6, strap 16 is movable between two shoulder heights for securing large or small children in seat 12. However, strap 16 is also moveable to a third shoulder height by including at least three sets of seat back apertures and two strap mounts in a child-restraint apparatus. For example, upper seat back apertures 72, 74 provide a location for securing strap 16 at a long shoulder height similar to the position shown in FIG. 1; lower seat back apertures 76, 78 and strap mount 80 provide a location for securing middle parts 118, 120 at an intermediate shoulder height similar to the position shown in FIG. 6; and a third set of seat back apertures (not shown) positioned to lie below lower seat back apertures 76, 78 and another strap mount (not shown) similar to strap mount 80 and positioned adjacent the third set of seat back apertures provide a location for securing middle parts 118, 120 of strap 16 at a short shoulder height.

To establish the long shoulder height, middle parts 118, 120 of strap 16 are not coupled to either strap mount. To establish the intermediate shoulder height, middle parts 118, 120 are pushed through lower seat back apertures 76, 78 to form loops 130, 132 that are secured to seat back 34 by strap mount 80 as previously described. To establish the short shoulder height, middle parts 118, 120 of strap 16 are pushed through the third set of seat back apertures and secured to seat back 34 by the second strap mount. Thus, by providing three sets of seat back apertures and two strap mounts, strap 16 may be moved between three shoulder heights. Additional shoulder heights are also possible by providing addition sets of seat back apertures and additional strap mounts described.

To adjust the amount of "slack" in second and fourth segments 18, 20, strap buckle 54 is loosened and sixth segment 50 is "shortened" to provide additional slack in second and fourth segments 18, 20 without removing body strap 16 from seat 12. This slack is fed through seat 12 until it is evenly distributed between second and fourth segments 18, 20. Upon obtaining the proper amount of slack in second and fourth segments 18, 20, strap buckle 54 is tightened. To remove slack from second and fourth segments 18, 20, strap buckle 54 is loosened and the extra slack of second and fourth segments 18, 20 is fed through seat 12 and pulled through strap buckle 54 to "lengthen" sixth segment 50.

Although the invention has been disclosed in detail with reference to certain preferred embodiments, variations and modifications exist within the scope and spirit of the invention.

What is claimed is:

1. A child-restraint apparatus comprising
a seat adapted to seat a child and
a continuous body strap having multiple segments configured to pass through apertures formed in the seat so that some of the segments extend across a forward-facing portion of the seat to restrain a child positioned in the seat and other segments extend across a vertical centerline of a rearward-facing portion of the seat to anchor the body strap to the seat, wherein the body strap is configured to have an end at the rearward-facing portion of the seat.

2. The child-restraint apparatus of claim 1, wherein the seat includes a right side and a left side and the segments of the body strap extending across the rearward-facing portion of the seat extend between the right side and the left side.

3. The child-restraint apparatus of claim 1, wherein the seat includes a seat bottom and the segments of the body strap extending across the rearward-facing portion of the seat extend toward the seat bottom.

4. The child-restraint apparatus of claim 1, further comprising a strap mount, wherein the seat includes a seat back and the strap mount is coupled to the seat back and the segments of the body strap extending across the forward-facing portion of the seat.

5. The child-restraint apparatus of claim 4, further comprising a buckle unit, wherein the seat includes a seat bottom coupled to the seat back, the buckle unit is coupled to a seat bottom and the segments of the body strap extending across the forward-facing portion of the seat.

6. The child-restraint apparatus of claim 1, further comprising a buckle unit, wherein the seat includes a seat back and a seat bottom coupled to the seat back, the buckle unit is coupled to a seat bottom and the segments of the body strap extending across the forward-facing portion of the seat.

7. The child-restraint apparatus of claim 6, wherein the buckle unit includes a crotch strap coupled to the seat bottom and a buckle coupled to the crotch strap and the segments of the body strap extending across the forward-facing portion of the seat.

8. The child-restraint seat of claim 6, wherein the buckle unit is coupled to two spaced-apart segments of the continuous body strap.

9. A child-restraint apparatus comprising
a seat adapted to seat a child and
a continuous body strap having multiple segments configured to pass through apertures formed in the seat so that some of the segments extend across a forward-facing portion of the seat to restrain a child positioned in the seat and other segments extend across a rearward-facing portion of the seat to anchor the body strap to the seat, wherein the segments extending across the rearward-facing portion of the seat cooperate to define an X-shaped anchor arranged to embrace the rearward-facing portion of the seat.

10. The child-restraint apparatus of claim 8, wherein the seat includes a seat back and the X-shaped anchor includes a first leg and a second leg positioned to lie between the first leg and the seat back.

11. The child-restraint apparatus of claim 8, wherein the body strap includes, in series, first, second, third, fourth, and fifth segments and the first, third, and fifth segments cooperate to define the X-shaped anchor.

12. The child-restraint apparatus of claim 9, further comprising a strap buckle, wherein the strap buckle couples to two segments of the body strap extending across the rearward-facing portion of the seat to define a first leg of the X-shaped anchor and another segment extending across the rearward-facing portion of the seat defines a second leg of the X-shaped anchor.

13. A child-restraint apparatus comprising
a seat having a seat bottom and a seat back coupled to the seat bottom,
a body strap including a first restraint portion positioned to lie on a front side of the seat and a second restraint portion positioned to lie on the front side of the seat, the first and second restraint portions including top parts secured to the seat back, bottom parts secured to the seat, and middle parts positioned to lie between the top and bottom parts, and
a strap mount directly coupled to the seat back and the middle parts of the first and second restraint portions, wherein the strap mount includes an extended member coupled to the seat back that couples the first and second middle parts to the seat back.

14. A child-restraint apparatus comprising
a seat adapted to seat a child,
a continuous body strap having multiple segments configured to pass through apertures formed in the seat so that some of the segments extend across a forward-facing portion of the seat to restrain a child positioned in the seat and other segments extend across a rearward-facing portion of the seat to anchor the body strap to the seat, a strap mount, wherein the seat includes a seat back and the strap mount is coupled to the seat back and the segments of the body strap extending across the forward-facing portion of the seat, and a strap buckle, wherein the body strap includes a first end and a second end spaced apart from the first end and the strap buckle couples the first end of the body strap to one of the segments of the body strap extending across the rearward-facing portion of the seat.

15. A child-restraint apparatus comprising a seat adapted to seat a child, a continuous body strap having multiple segments configured to pass through apertures formed in the seat so that some of the segments extend across a forward-facing portion of the seat to restrain a child positioned in the seat and other segments extend across a rearward-facing portion of the seat to anchor the body strap to the seat, a strap mount, wherein the seat includes a seat back and the strap mount is coupled to the seat back and the segments of the body strap extending across the forward-facing portion of the seat, and the body strap includes, in series, first, second, third, fourth, and fifth segments and the strap mount coupled to the second and fourth segments to the seat back.

16. A child-restraint apparatus comprising a seat having a seat bottom and a seat back coupled to the seat bottom, a body strap including a first restraint portion positioned to lie on a front side of the seat and a second restraint portion positioned to lie on the front side of the seat, the first and second restraint portions including top parts secured to the seat back, bottom parts secured to the seat, and middle parts positioned to lie between the top and bottom parts, and a strap mount coupled to the seat back and the middle parts of the first and second restraint portions, wherein the seat bottom is formed to include a first seat bottom aperture, and a second seat bottom aperture, the seat back is formed to include a first upper seat back aperture, a first lower seat back aperture positioned to lie between the first upper seat back aperture and the first seat bottom aperture, a second upper seat back aperture, and a second lower seat back aperture positioned to lie between the second upper seat back aperture and the second seat bottom aperture, the bottom part of the first restraint portion extends into the first seat bottom aperture, the top part of the first restraint portion extends into the first upper seat back aperture, the middle part of the first restraint portion extends through the first lower seat back aperture to form a first loop, the bottom part of the second restraint portion extends into the second seat bottom aperture, the top part of the second restraint portion extends into the second upper seat back aperture, and the middle part of the second restraint extends through the second lower seat back aperture to form a second loop.

17. The child-restraint apparatus of claim 16, wherein the strap mount includes a rod positioned to lie in the first and second loops.

18. A child-restraint apparatus comprising a seat adapted to seat a child, a continuous body strap having multiple segments configured to pass through apertures formed in the seat so that some of the segments extend across a forward-facing portion of the seat to restrain a child positioned in the seat and other segments extend across a rearward-facing portion of the seat to anchor the body strap to the seat, and a buckle unit, wherein the seat includes a seat back and a seat bottom coupled to the seat back, the buckle unit is coupled to a seat bottom and the segments of the body strap extending across the forward-facing portion of the seat, and the buckle unit includes a first latch plate coupled to slide on one of the segments of the body strap extending across the forward-facing portion of the seat and a second latch plate coupled to slide on one of the segments of the body strap extending across the forward-facing portion of the seat.

19. A child-restraint apparatus comprising a seat having a seat bottom and a seat back coupled to the seat bottom, a body strap including a first restraint portion positioned to lie on a front side of the seat and a second restraint portion positioned to lie on the front side of the seat, the first and second restraint portions including top parts secured to the seat back, bottom parts secured to the seat, and middle parts positioned to lie between the top and bottom parts, a strap mount directly coupled to the seat back and the middle parts of the first and second restraint portions, and a strap retainer, wherein the strap retainer is coupled to the middle parts of the first and second restraint portions between the strap mount and a crotch restraint.

20. A child-restraint apparatus comprising a seat adapted to seat a child, a continuous body strap having multiple segments configured to pass through apertures formed in the seat so that some of the segments extend across a forward-facing portion of the seat to restrain a child positioned in the seat and other segments extend across a rearward-facing portion of the seat to anchor the body strap to the seat, and a strap buckle, wherein the body strap includes a first end and a second end spaced apart from the first end and the strap buckle couples the first end of the body strap to one of the segments of the body strap extending across the rearward-facing portion of the seat.

21. The child-restraint apparatus of claim 20, wherein the body strap includes, in series, first, second, third, fourth, and fifth segments and the strap buckle couples the first to the third segment.

22. A child-restraint apparatus comprising a seat adapted to seat a child and a continuous body strap having multiple segments configured to pass through apertures formed in the seat so that some of the segments extend across a forward-facing portion of the seat to restrain a child positioned in the seat and other segments extend across a rearward-facing portion of the seat to anchor the body strap to the seat, wherein the body strap includes, in series, a first segment including a first end of the body strap extending across the rearward-facing portion of the seat, a second segment extending across the forward-facing portion of the seat, a third segment extending across the rearward-facing portion of the seat, a fourth segment extending across the forward-facing portion of the seat, and a fifth segment extending across the rearward-facing portion of the seat.

23. The child-restraint apparatus of claim 22, wherein the first and fifth segments cooperate to define a first leg of an X-shaped anchor, the third segment defines a second leg of the X-shaped anchor, and the X-shaped anchor secures the second and fourth segments to the seat.

24. The child-restraint apparatus of claim 22, further comprising a buckle unit, wherein the seat includes a seat bottom and the buckle unit is coupled to the seat bottom and the second and fourth segments of the body strap.

25. The child-restraint apparatus of claim 22, further comprising a strap buckle, wherein the first segment includes a first end of the body strap coupled to the strap buckle and the fifth segment of the body strap.

26. The child-restraint apparatus of claim 22, wherein the second segment is spaced apart from the fourth segment.

27. The child-restraint apparatus of claim 22, wherein the seat includes a seat back and the second segment is secured to the seat back at two spaced-apart locations.

28. A child-restraint apparatus comprising
   a seat having a seat bottom and a seat back coupled to the seat bottom,
   a body strap including a first restraint portion positioned to lie on a front side of the seat and a second restraint portion positioned to lie on the front side of the seat, the first and second restraint portions including top parts secured to the seat back, bottom parts secured to the seat, and middle parts positioned to lie between the top and bottom parts, and
   a strap mount directly coupled to the seat back and the middle parts of the first and second restraint portions, wherein the strap mount includes a rod coupled to the middle parts of the first and second restraint portions.

29. The child-restraint apparatus of claim 28, wherein the seat back and the seat bottom cooperate to define a back side of the seat and the rod is positioned to lie on the back side of the seat.

30. The child-restraint apparatus of claim 28, wherein the strap mount further includes a resilient member securing the rod to the seat.

31. A child-restraint apparatus comprising
   a seat having a seat bottom and a seat back coupled to the seat bottom,
   a body strap including a first restraint portion positioned to lie on a front side of the seat and a second restraint portion positioned to lie on the front side of the seat, the first and second restraint portions including top parts secured to the seat back, bottom parts secured to the seat, and middle parts positioned to lie between the top and bottom parts, and
   a strap mount directly coupled to the seat back and the middle parts of the first and second restraint portions, wherein the body strap is configured to have an end at a back side of the seat.

32. The child-restraint apparatus of claim 31, wherein the seat back and the seat bottom cooperate to define a back side of the seat and the strap mount is positioned to lie on the back side of the seat.

33. The child-restraint apparatus of claim 31, further comprising a crotch restraint spaced apart from the strap mount and coupled to the seat bottom and the first and second middle parts of the first and second restraint portions of the strap.

34. The child-restraint apparatus of claim 31, wherein the middle parts form loops coupled to the strap mount.

35. The child-restraint apparatus of claim 34, wherein the seat back and seat bottom cooperate to define a back side of the seat and the loops are positioned to lie on the back side of the seat.

36. A child-restraint apparatus comprising
   a seat having a front side adapted to receive a child seated thereon,
   a body strap including a first and second restraint portions configured to restrain a child positioned to lie in the seat, the restraint portions including top parts secured to the front side of the seat, bottom parts secured to the seat, and middle parts positioned between the top and bottom parts, and
   means for directly coupling the middle parts of the first and second restraint portions to the seat to establish a lower shoulder height without unsecuring the top parts of the first and second restraint portions from the seat.

37. The child-restraint apparatus of claim 36, wherein the coupling means includes a rod and means for coupling the rod to the seat.

38. The child-restraint apparatus of claim 36, wherein the coupling means includes means for restraining the middle part to the seat back and an elastic band coupling the restraining means to the seat back.

39. The child-restraint apparatus of claim 36, wherein the coupling means includes a rod and an elastic band coupling the rod to the seat back.

* * * * *